No. 763,576. PATENTED JUNE 28, 1904.
J. E. WAHLSTRÖM.
WHEEL FOR CYCLES OR OTHER VEHICLES.
APPLICATION FILED FEB. 17, 1904.
NO MODEL.
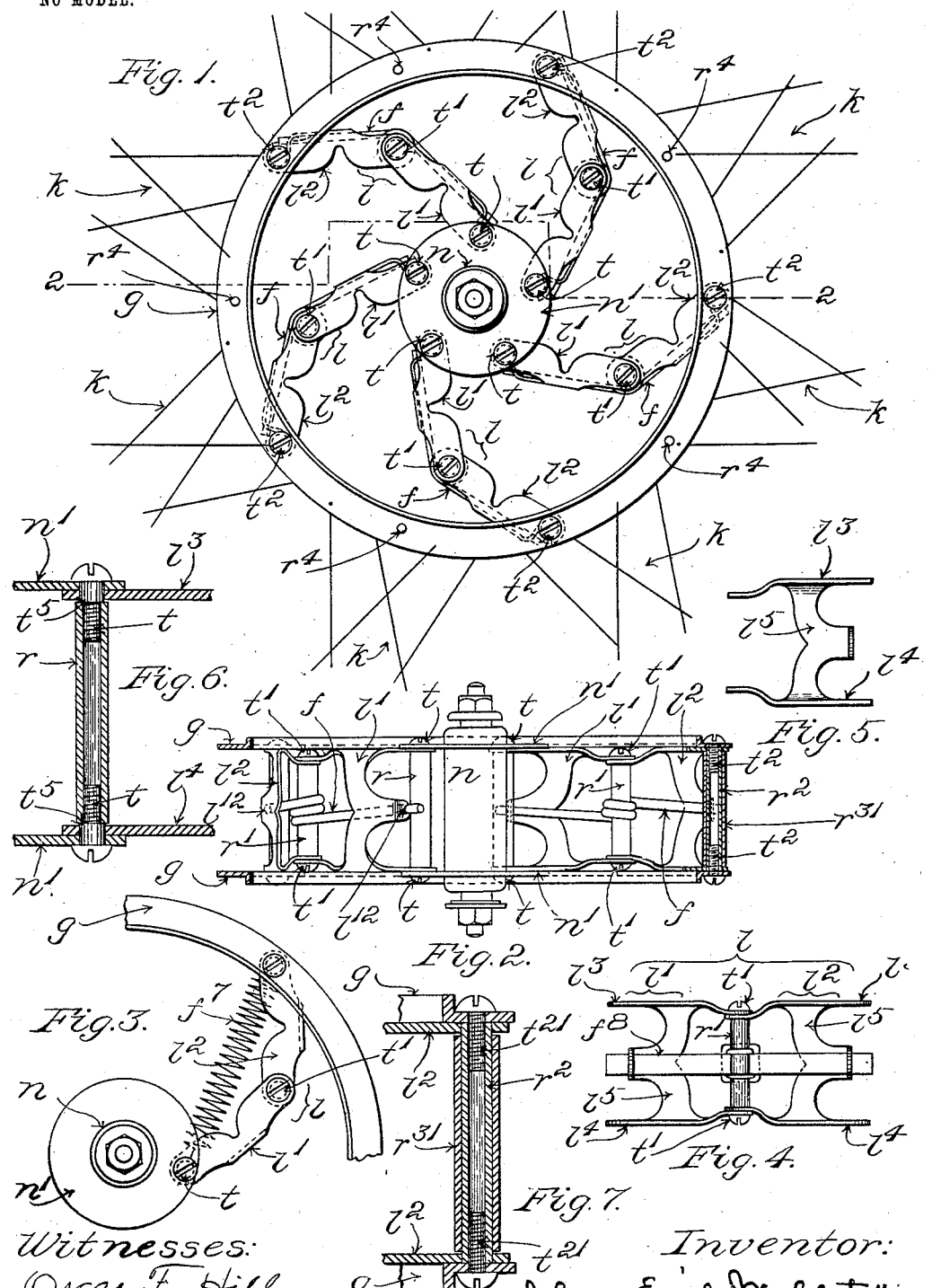
Witnesses:
Oscar F. Hill
Edith J. Anderson.
Inventor:
Johan Emil Wahlström
by MacLeod Calvert & Randall
Attorneys.

No. 763,576. Patented June 28, 1904.

UNITED STATES PATENT OFFICE.

JOHAN EMIL WAHLSTRÖM, OF SUNDSVALL, SWEDEN.

WHEEL FOR CYCLES OR OTHER VEHICLES.

SPECIFICATION forming part of Letters Patent No. 763,576, dated June 28, 1904.

Application filed February 17, 1904. Serial No. 194,020. (No model.)

*To all whom it may concern:*

Be it known that I, JOHAN EMIL WAHLSTRÖM, a citizen of Sweden, residing at Sundsvall, Norrland, Sweden, have invented a certain new and useful Improvement in Wheels for Cycles, Automobiles, or other Vehicles, of which the following is a specification, reference being had therein to the accompanying drawings.

The invention consists in a wheel of improved and novel construction in which elastic "knee-levers," as I term them, are employed in combination with the hub and the outer portion of a wheel, the said knee-levers connecting the said outer portion with the hub and operating to secure an elastic or cushioned action of the wheel in service and to enable the employment of a pneumatic or other elastic tire to be dispensed with.

I have shown embodiments of the invention in the accompanying drawings, in which—

Figure 1 represents in side elevation the hub and adjacent parts of a wheel, including portions of the spokes, and shows the preferred embodiment of the invention. Fig. 2 is a view mainly in section along the line 2 2 of Fig. 1. Fig. 3 is a detail view in side elevation, showing another embodiment of the invention. Fig. 4 is a detail view showing in plan another embodiment of the invention. Fig. 5 shows one of the links of the knee-levers detached. Fig. 6 is a detail view showing in section one form of pivotal connection and stay. Fig. 7 is a view similar to Fig. 6, showing a second form of pivotal connection and stay.

The hub of a wheel is represented at $n$ in Figs. 1 and 2. It is shown furnished with oppositely-located radial flanges $n'$ $n'$. Portions of the spokes of the wheel are shown at $k$. Instead of being connected directly with the flanges of the hub, as ordinarily the case in practice, the inner extremities of the said spokes are connected to one or more rings $g$ $g$. Two rings $g$ $g$ are shown in Figs. 1 and 2 arranged parallel with each other and connected together by means of transverse stay rods or tubes, although in practice I shall in some cases employ a single ring. The ring or rings $g$ $g$ are connected with the hub by means of a series of knee-levers $l$. Five knee-levers are represented in Fig. 1. Each knee-lever consists of two links—namely, $l'$ and $l^2$ and a spring, as $f$. The said links are jointed together, the link $l'$ being in addition jointed to the hub $n$ and the link $l^2$ being jointed to the ring or rings $g$ $g$. Each link is forked at its opposite ends, as shown, for instance, by Fig. 5, and consists of two side pieces $l^3$ $l^4$, which are connected by a cross-piece $l^5$, that is located in an intermediate position in the length of the link. The side pieces and cross-piece are in one piece, as shown in the drawings, and the whole link is made of sheet metal cut and bent into the desired shape. In order to secure the greatest amount of strength and rigidity, the side pieces $l^3$ $l^4$ are caused to stand at right angles to the cross-piece $l^5$, constituting flanges at the opposite sides of the link. The illustrated link is exceedingly strong and stiff, while at the same time it is light in weight.

The mode and means of effecting the pivotal connection of the ends of the side pieces $l^3$ $l^4$ of the respective links of each knee-lever with the hub $n$, with each other, and with the ring or rings $g$ $g$ may vary in practice in some cases within certain limits without involving departure from the broader principles of the invention. At each joint of the knee-levers the line of pivotal connection and support is of considerable length.

By reason of the length of each line of pivotal connection and support, measured in the direction of the length of the axis of the wheel, a steadiness and a firmness are secured corresponding with that which results when the spokes are attached to the opposite flanges of the hub directly. In the drawings I have represented one arrangement in which the joint is formed by the employment of two pivotal screws in line with each other, respectively engaging with the opposite side pieces of a link of a knee-lever, and another arrangement in which the joint is formed by the employment of a rod or tube of considerable length, providing pivotal supports at its opposite ends for the opposite side pieces of a link. In Figs. 1, 2, and 6 the inner ends of the opposite side pieces of the link $l'$ of each knee-lever overlap with the corresponding flanges $n'$ $n'$ of the hub $n$. They are shown fitting against the inner surfaces of the said flanges; but it is not strictly material whether they fit against the said surfaces or the outer surfaces of the flanges. The pivotal connection of the respective inner ends with the corresponding flanges $n'$ $n'$ may be effected, as indicated in Fig. 6, by passing the two screws $t$ $t$ through holes that are formed in the said parts. The said screws constitute pivotal connections extending in the same line parallel with the axis of the wheel and located at opposite sides of the wheel. The outer ends of the side pieces $l^3$ $l^4$ of the inner link $l'$ of each knee-lever are shown overlapping with the inner ends of the corresponding side pieces of the outer link $l^2$ of the knee-lever. The said meeting and overlapping ends may be connected pivotally together in pairs by passing the two screws $t'$ $t'$ through holes therein substantially in the manner in which the screws $t$ $t$ pass through the flanges $n'$ $n'$ of hub $n$ and the inner ends of the side pieces of the link $l'$ in Fig. 6. The outer ends of the side pieces of the link $l^2$ of each knee-lever are shown overlapped with the rings $g$ $g$. They are also shown fitting against the inner surfaces of the said rings, although in other constructions they may be arranged to fit against the outer surfaces of the rings. The pivotal connection of the said outer ends with the said rings may be effected by passing the screws $t^2$ $t^2$ through holes in the said outer ends and the rings, substantially as described above with reference to Fig. 6 in connection with the other joints.

For the purpose of holding the parts together at each point of pivotal connection nuts may be applied to the threaded portions or stems of the screws $t$ $t'$ $t^2$ in well-known manner. Usually, however, in place of such nuts rods or tubes $r$ $r'$ $r^2$ are employed at the different joints. These rods or tubes extend from side to side of the wheel. The rod or tube $r$ extends across the wheel from the flange $n'$ and side piece $l^3$ or $l^4$ at one side of the wheel to the corresponding pair of parts at the other side of the latter, and the stems of the screws $t$ $t$ enter the ends of the said rod or tube, as shown in Fig. 6, the said ends being screw-threaded interiorly to engage with the threaded portions of the screws. The rod or tube $r'$ extends across from the pair of meeting and overlapping ends of the side pieces at one side of the wheel to the corresponding pair at the opposite side of the wheel, the stems of the screws $t'$ $t'$ entering the internally-threaded opposite ends of the said rod or tube. The rod or tube $r^2$ extends across from the ring $g$ and corresponding end of one side piece of the outer link $l^2$ at one side of the wheel to the similar pair of parts at the other side thereof, and the stems of the screws $t^2$ $t^2$ enter the internally-threaded opposite ends of the said rod or tube $r^2$. The employment of the rods or tubes $r$ $r'$ $r^2$ or equivalent devices at the joints, as aforesaid, in connection with the screws is advantageous, inasmuch as it is desirable to stiffen or stay the knee-levers and rings $g$ $g$ transversely. Not only do such rods or tubes enable the parts at the opposite sides of the wheel to be united, so as to prevent the same from separating more widely, but the rods, tubes, or the like are useful also in preventing the parts at one side of the wheel from moving inward toward the parts at the other side thereof. This latter result may be secured in different ways. In Fig. 6 in order that the rod or tube may serve as a distance-piece by means of which the pair of parts at one end of the same shall be held at a predetermined distance apart from the corresponding pair of parts at the other end thereof the opposite ends of the said rod or tube are arranged to bear against the inner surfaces of the side pieces $l^3$ $l^4$ of the link $l'$. In Fig. 7 the rod or tube $r^2$ passes into and through holes that are formed in the outer ends of the side pieces of the outer link $l^2$. The inner surfaces of the rings $g$ $g$ are clamped against the ends of the rod or tube $r^2$ by means of the screws $t^{21}$ $t^{21}$. The said rod or tube $r^2$ serves as a distance-piece or stay for the said rings. The ends of the rod or tube $r^2$ enter into holes that are formed through the outer ends of the side pieces of the outer link $l^2$ of the knee-lever and constitute pivots therefor in line with each other. A sleeve or shell $r^{31}$, fitting upon the exterior of the rod or tube $r^2$, engages by its ends with the inner surfaces of the outer ends of the side pieces of the link $l^2$ and serves as a distance-piece and stay therefor. In lieu of the sleeve or shell $r^{31}$ collars or shoulders might be provided upon the rod or tube $r^2$ for engagement with the inner surfaces of the link $l^2$. It will be apparent that the stays engaging, as described, with the side pieces of the links of the knee-levers steady the said side pieces, so that these may be better able to resist side pressure.

It is necessary to insure freedom of movement of the members or links of the respective knee-levers at the different points of pivotal connection. I therefore make provision whereby when the screws $t$ $t'$ $t^2$ $t^{21}$ are tightened up the side pieces of the links of each knee-lever may be prevented from becoming so clamped or held at the joints as to interfere with the free and easy movement of the respective links. One means of securing the desired result is shown in Fig. 6, in which figure each screw $t$ is provided with a spacing-shoulder, as $t^5$. The said shoulder by its contact with the corresponding end of the rod or tube $r$ limits the extent to which the screw may be caused to enter within the rod or tube. Thereby the head of the screw is prevented from approaching so closely to the end of the rod or tube as to compress the corresponding side piece and flange together and against the said end, with resulting difficulty of movement. In a construction in which the rod or tube is omitted and nuts are employed the spacing-shoulder $t^5$ will operate to limit the distance to which the nut may be turned onto each screw, thereby preventing the parts which should move relative to each other from becoming clamped against the head of the screw by the tightening of the nut, so as to prevent movement of such parts. Should the inner ends of the side pieces $l^3 l^4$ be fitted against the outer surfaces of the flanges $n' n'$, as I contemplate in some instances, the spacing-shoulders $t^5 t^5$, Fig. 6, of the screws $t t$ will be arranged to take against the sides of the flanges $n' n'$. This may be the case, also, when the rod or tube $r$ is omitted and nuts are employed instead thereof. In Fig. 7 the difference between the length of the spacing sleeve or tube $r^{31}$ and that of the rod or tube $r^2$ leaves space at the opposite ends of the said rod or tube $r^2$ between the ends of the sleeve or rod $r^{31}$ and the heads of the screws $t^{21} t^{21}$ sufficient to obviate binding of the ends of the side pieces of the link $l^2$, thereby providing for free play of the said link.

In a construction in which the ends of the side pieces of the link $l^2$ are applied at the outer sides of the rings $g g$ a shoulder $t^5$ of each screw should be caused to engage with the outer side of the corresponding ring, so that regardless of the tightening of the screw the link will remain free to move readily on that portion of the screw which extends between the ring and the head of the screw.

Stays may be employed in connection with the rings $g g$ intermediate the points at which the links $l^2 l^2$ are connected with the said rings, as indicated at $r^4$, Fig. 1.

In order to prevent screws $t t' t^2$ from getting loose, particularly when they are not provided with shoulders and for that reason cannot be drawn tight, a split pin or piece of wire, with the ends thereof bent over so as prevent it from falling out, may be put through a hole made through a screw and the corresponding rod or tube.

The springs $f$ (shown in Figs. 1 and 2) are each formed with a spiral of a small number of turns, from which the ends of the spring extend in opposite directions. When applied to a knee-lever, the spiral of the spring encircles the rod or tube $r'$, the opposite ends of the spring being engaged with the opposite links $l' l^2$ of the knee-lever. Preferably each link is formed with an opening therethrough, as at $l^{12} l^{12}$, Fig. 2, into which fits the corresponding end of the spring. The springs are constructed to cause the knee-levers to assume normally the partially-bent position in which they are represented in Fig. 1. In this position of the knee-levers the springs are substantially free from tension. They will oppose movement of the knee-levers in being either bent further or straightened and in either case will operate to return the knee-levers to such position as soon as permitted to act so to do. Thereby the elasticity of the springs is fully utilized, and fewer or weaker springs than otherwise would be required will in some instances be found to be sufficient. In order to enable a spring $f$ to be changed, it will be necessary simply to remove the screws $t' t'$, so as to permit the links $l' l^2$ of the knee-lever to be separated from each other and then withdraw the ends of the spring from the holes in the links and the rod or tube $r'$ from the spiral of the spring, after which the rod or tube may be inserted into the spiral of a new spring. The ends of such spring may be inserted into the holes in the links, the rod or tube may be put into position, and the screws $t' t'$ may be turned home.

Fig. 3 shows a spiral spring $f^7$ having one end thereof connected with a ring $g$ and the other end thereof connected with the flanges $n'$ of the hub $n$. In Fig. 4 a bent blade-spring $f^8$ is shown, the latter being kept in place upon rod or tube $r'$ by a suitable device for the purpose.

When using my invention, the wheel-rim may be unprovided with any yielding or elastic tire, or such a tire may be employed, if deemed desirable—for example, a solid-rubber ring or a hollow ring filled with cork or any other light material, rubber, leather, &c.

When using a single ring $g$, the outer half of the outer link $l^2$ of each knee-lever need not be forked.

I claim as my invention—

1. In a wheel for vehicles, in combination, the hub, the exterior ring or rings to which the spokes are connected, the knee-levers, and the springs in connection with the said knee-levers, each of the knee-levers comprising the links formed of sheet metal and respectively consisting of the cross-piece $l^5$ and the side pieces $l^3$, $l^4$, standing at right angles to the plane of the said cross-piece.

2. In a wheel for vehicles, in combination, the hub, the exterior ring or rings to which the spokes are connected, the knee-levers, the springs in connection with the knee-levers, and the staying and spacing members intervening between the opposite side portions at the points of pivotal connection and whereby the side pieces of the knee-levers are maintained separated from each other at fixed distances.

3. In a wheel substantially such as described, in combination, a knee-lever having side portions, as $l^3$, $l^4$, flanges $n'$, $n'$, a spacing rod or tube engaging at its ends with the opposite portions to hold them from approaching each other, and connecting means whereby the parts are held together transversely of the wheel.

4. In a wheel substantially such as described, in combination, a knee-lever having side portions, as $l^3$, $l^4$, flanges $n'$, $n'$, a spacing rod or tube engaging at its ends with the opposite portions to hold them from approaching each other, and the connecting-screws constituting pivotal connections between the flanges and side portions and shouldered to prevent the overlapping flanges and side portions from undue compression.

5. In a wheel substantially such as described, in combination, a knee-lever having side portions, as $l^3$, $l^4$, the rings, the spacing-tube intervening between the said side portions, the interior rod or tube having the said side portions hung upon the projecting ends thereof and also serving to space the rings apart, and the screws connecting the rings to the said interior rod or tube.

In testimony whereof I affix my signature in presence of two witnesses.

JOHAN EMIL WAHLSTRÖM.

Witnesses:
AXEL PETERS,
CHARLES ERICSSON.